United States Patent
Nakamura et al.

(10) Patent No.: US 12,307,393 B2
(45) Date of Patent: May 20, 2025

(54) VEHICLE TRAVEL ASSISTANCE DEVICE, VEHICLE TRAVEL ASSISTANCE SYSTEM, AND VEHICLE TRAVEL ASSISTANCE METHOD

(71) Applicants: Nissan Motor Co., Ltd., Kanagawa (JP); RENAULT S.A.S., Boulogne-Billancourt (FR)

(72) Inventors: Masahide Nakamura, Kanagawa (JP); Yutaka Mikuriya, Kanagawa (JP); Masaki Watanabe, Kanagawa (JP); Narihiro Akari, Kanagawa (JP); Xiaoxiao Fei, Kanagawa (JP); Kotaro Chiba, Kanagawa (JP)

(73) Assignees: Nissan Motor Co., Ltd., Kanagawa (JP); RENAULT S.A.S., Boulogne-Billancourt (FR)

(*) Notice: Subject to any disclaimer, the term of this patent is extended or adjusted under 35 U.S.C. 154(b) by 0 days.

(21) Appl. No.: 18/556,004

(22) PCT Filed: Apr. 19, 2021

(86) PCT No.: PCT/IB2021/000301
§ 371 (c)(1),
(2) Date: Oct. 18, 2023

(87) PCT Pub. No.: WO2022/224004
PCT Pub. Date: Oct. 27, 2022

(65) Prior Publication Data
US 2024/0211819 A1 Jun. 27, 2024

(51) Int. Cl.
*G06Q 10/02* (2012.01)
*G06Q 50/47* (2024.01)

(52) U.S. Cl.
CPC ............ *G06Q 10/02* (2013.01); *G06Q 50/47* (2024.01)

(58) Field of Classification Search
CPC .. G06Q 10/02; G06Q 50/47; B60W 60/00253
See application file for complete search history.

(56) References Cited

U.S. PATENT DOCUMENTS

| | | | |
|---|---|---|---|
| 2019/0054926 A1 | 2/2019 | Wasekura | |
| 2019/0103028 A1* | 4/2019 | Kobayashi | G08G 1/202 |

(Continued)

FOREIGN PATENT DOCUMENTS

| | | | |
|---|---|---|---|
| JP | 2019-036228 A | | 3/2019 |
| JP | 2019218057 A | * | 12/2019 |

OTHER PUBLICATIONS

Neema Nassir, Activity detection and transfer identification for public transit fare card data, 2015, pp. 683-705 (Year: 2015).*

*Primary Examiner* — Ibrahim N El-Bathy
(74) *Attorney, Agent, or Firm* — Osha Bergman Watanabe & Burton LLP

(57) ABSTRACT

The present invention provides a travel assistance device (1) for a vehicle, a travel assistance system (S) for a vehicle, and a travel assistance method for a vehicle with which the waste of energy of a vehicle (V) can be suppressed. In the present invention, when an unexpected user (UI) who has alighted at a stop location other than his/her alighting location included in reservation information is identified, a confirmation notification is output to the unexpected user (UI) as to whether or not to board the vehicle (V) again. When a determination is made, based on an input from the unexpected user (UI) in response to the output confirmation notification, that the unexpected user will not board the vehicle (V) again, the vehicle (V) is started from the stop location.

12 Claims, 13 Drawing Sheets

(56) References Cited

U.S. PATENT DOCUMENTS

| | | |
|---|---|---|
| 2019/0144000 A1 | 5/2019 | Hennes et al. |
| 2020/0041292 A1 | 2/2020 | Sugiyama et al. |
| 2020/0065722 A1* | 2/2020 | Smith ................... H04W 4/023 |
| 2021/0004728 A1* | 1/2021 | Uribe Gonzalez .... G08G 1/202 |
| 2021/0223051 A1* | 7/2021 | Hochberg ............ G06V 20/593 |

* cited by examiner

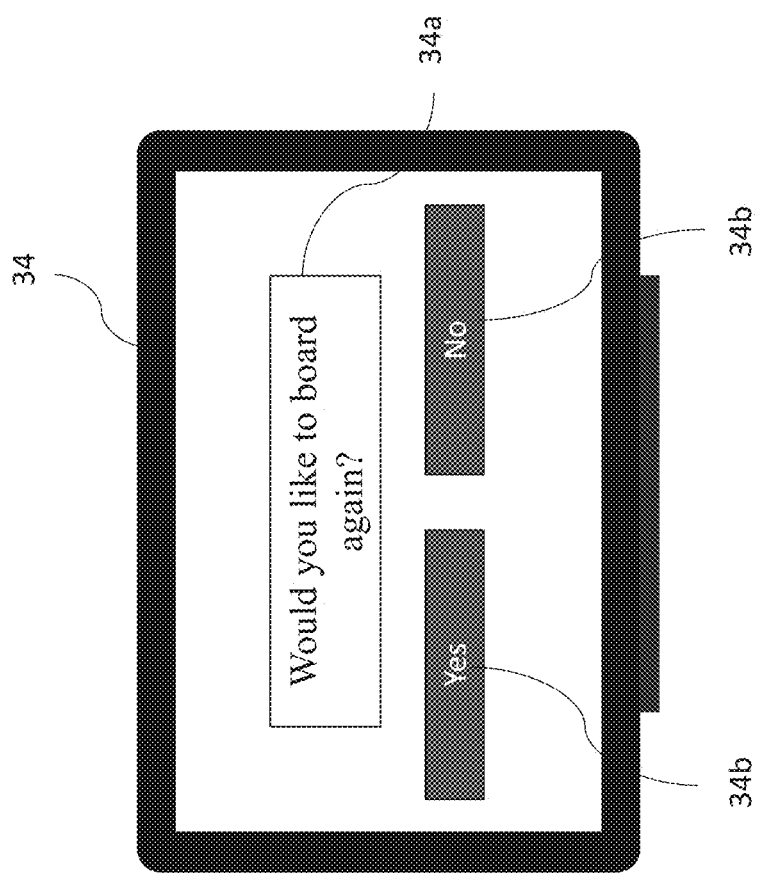

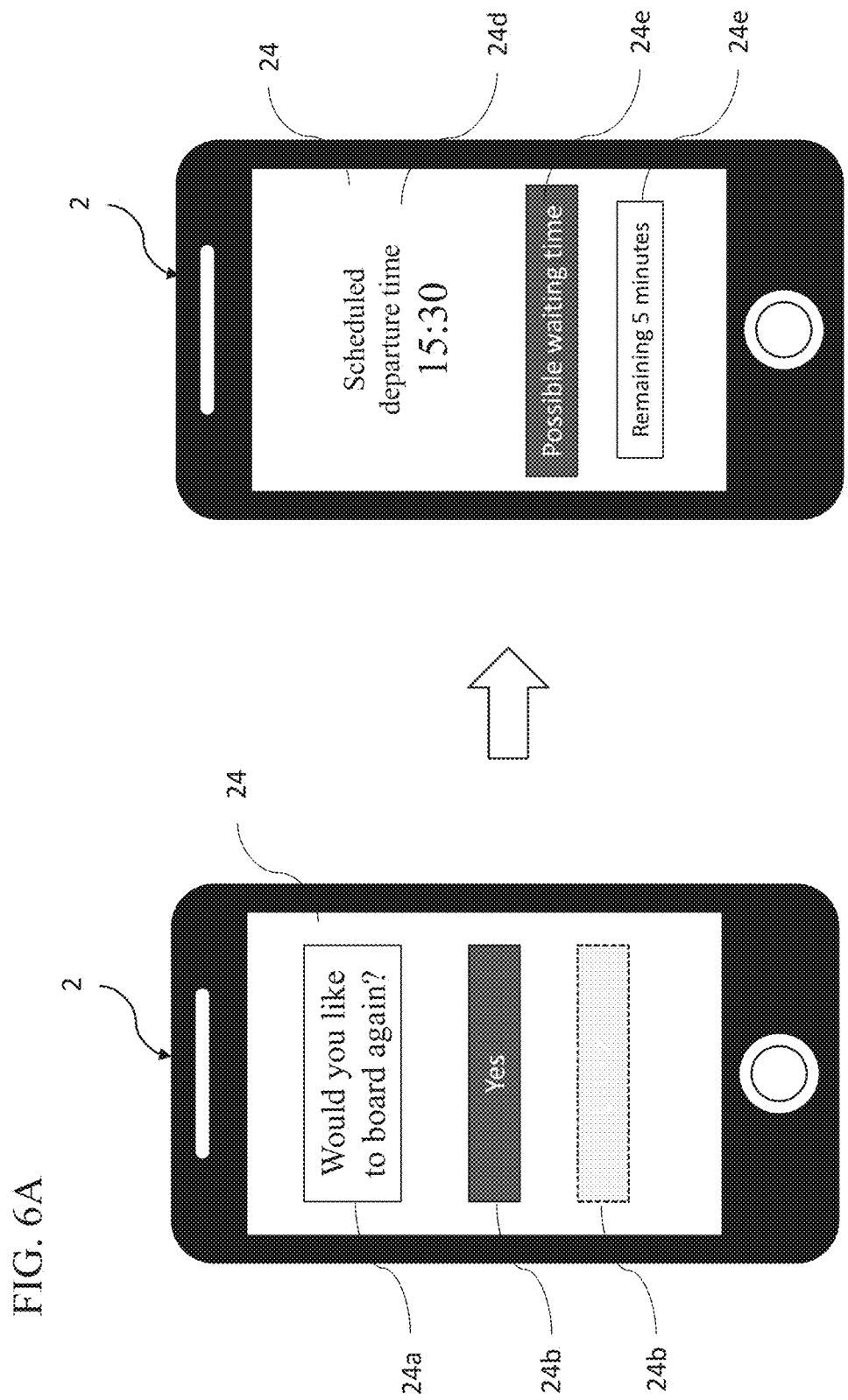

VEHICLE TRAVEL ASSISTANCE DEVICE, VEHICLE TRAVEL ASSISTANCE SYSTEM, AND VEHICLE TRAVEL ASSISTANCE METHOD

TECHNICAL FIELD

The present invention relates to a travel assistance device for a vehicle that allows a plurality of users to board/alight, a travel assistance system for a vehicle, and a travel assistance method for a vehicle.

BACKGROUND ART

An automated driving vehicle providing a driverless transport service is known in the art (Patent Document 1). Upon start of the vehicle, when the authentication of a user is established and the user's departure intention is confirmed, the start of the vehicle is permitted.

PRIOR ART DOCUMENT

Patent Document

[Patent Document 1] JP2019-36228A

SUMMARY OF INVENTION

Problems to be Solved by Invention

In the above conventional automated driving vehicle, however, start permission conditions include the confirmation of the user's departure intention in addition to the authentication of the user, so if there is a user who has alighted at a location other than the reserved alighting location, the vehicle cannot be started until the user's departure intention can be confirmed, thus leading to a problem in that the vehicle fuel and other energy will be wasted.

The problem to be solved by the present invention is to provide a travel assistance device for a vehicle, a travel assistance system for a vehicle, and a travel assistance method for a vehicle with which the waste of energy of the vehicle can be suppressed even when there is a user who has alighted at a location other than the reserved alighting location.

Means for Solving Problems

The present invention solves the above problem through, when identifying an unexpected user who has alighted at a stop location other than his/her alighting location included in reservation information, outputting a confirmation notification to the unexpected user as to whether or not to board the vehicle again and determining, based on an input from the unexpected user in response to the output confirmation notification, that the unexpected user will not board the vehicle again, and when determining that the unexpected user will not board the vehicle again, outputting start permission information for starting the vehicle from the stop location.

Effect of Invention

According to the present invention, even when there is a user who has alighted at a location other than the reserved alighting location, the waste of energy of the vehicle can be suppressed.

BRIEF DESCRIPTION OF DRAWINGS

FIG. 4B is a diagram illustrating an example of the display screen of an onboard control device of a vehicle.

FIG. 6A is a diagram (part 1) illustrating still another example of the display screen of a terminal device carried by a user.

MODE(S) FOR CARRYING OUT THE INVENTION

Hereinafter, one or more embodiments of the present invention will be described with reference to the drawings. In the travel assistance device and method for a vehicle according to the present invention, reservation information including unique identifiers and alighting locations of users is stored, a stop location of the vehicle and the unique identifiers of users who have alighted at the stop location are detected, and an unexpected user who has alighted at the stop location other than his/her reserved alighting location is identified based on the unique identifiers and alighting locations of the users included in the users' reservation information. Then, a confirmation notification is output to the unexpected user as to whether or not to board the vehicle again and a determination is made, based on an input from the unexpected user in response to the output confirmation notification, that the unexpected user will not board the vehicle again. When the determination is made that the unexpected user will not board the vehicle again, the vehicle is started from the stop location.

The present invention will be described below by taking as an example a travel assistance system S for a vehicle using the travel assistance device and method for a vehicle according to the present invention. The travel assistance system S for a vehicle of the present embodiment receives vehicle use reservations from a plurality of users and sets a driving plan including a vehicle travel route in accordance with the boarding locations, boarding times, alighting locations, and alighting times included in the users' use reservation information. This system allows the users to sequentially ride together based on the driving plan and transports the users from respective boarding locations to respective alighting locations. Usable vehicles include unmanned taxis, manned taxis, and commercial vehicles having autonomous travel functions. The following description will be made for an example in which the system of this example is applied to a transport service using unmanned taxis.

Figure 1:
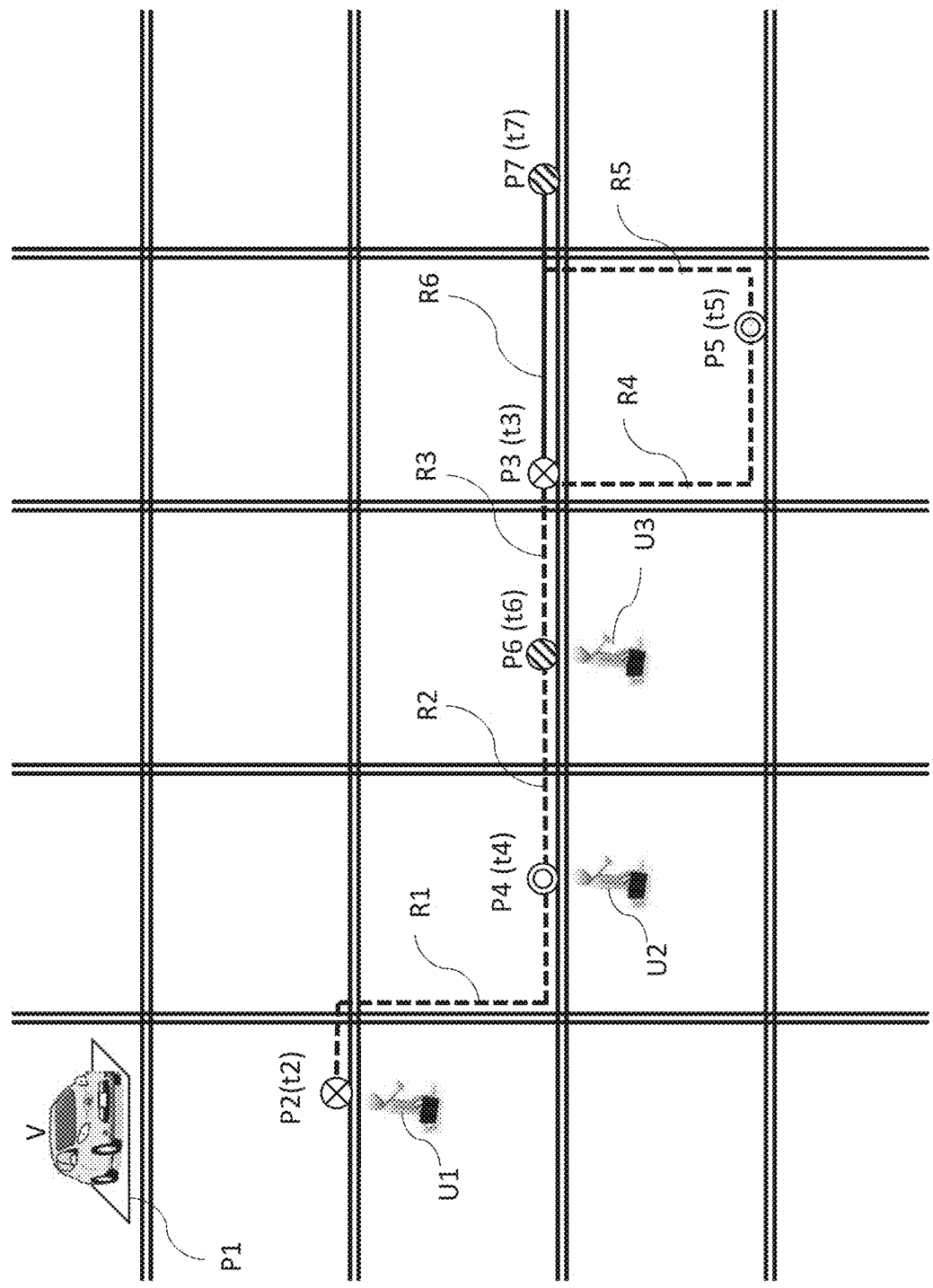
FIG. 1 is an explanatory diagram illustrating an example of a scene in which users use a vehicle in a travel assistance system for a vehicle according to an embodiment of the present invention.

FIG. 1 is an explanatory diagram illustrating an example of a scene in which the users use a vehicle V (unmanned taxi) in the travel assistance system S for a vehicle of the present embodiment. In the travel assistance system S for a vehicle of the present embodiment, a plurality of users U (collectively referring to U1, U2, and U3) operate the application software of terminal devices 2 carried by the users U and input reservation information such as boarding locations, boarding times, number of passengers, alighting locations, and alighting times desired by the users U. In response to this, a travel assistance device 1 extracts a vehicle V responsible for the requests from the users U from among a plurality of prepared vehicles, sets a driving plan, and commands the vehicle V to head for the boarding location at the boarding time set by the user U who boards first. After picking up the users U based on the driving plan at respective boarding locations set by the users U, the vehicle V controls traveling to respective alighting locations set by the users U and makes the users U alight at the alighting locations.

For example, the scene illustrated in FIG. 1 represents a case in which three users U1, U2, and U3 ride together in one vehicle V. It is assumed that one user U1 outputs to the travel assistance device 1 a request for transportation from a boarding location P2 (boarding time t2) to an alighting location P3 (alighting time t3), and the travel assistance device 1 receives this use request from the user U1. It is also assumed that another user U2 outputs a request for transportation from a boarding location P4 (boarding time t4) to an alighting location P5 (alighting time t5) while still another user U3 outputs a request for transportation from a boarding location P6 (boarding time t6) to an alighting location P7 (alighting time t7), and the travel assistance device 1 receives these use requests from the users U2 and U3. It is further assumed that the boarding locations P2, P4, and P6 and alighting locations P3, P5, and P7 of the three users U1, U2, and U3 do not overlap, and the one vehicle V waiting at a waiting station P1 responds to the use requests from the three users U1, U2, and U3.

In such a scene, the travel assistance device 1 calculates a travel route R1→R2→R3→R4→R5 (see dashed line) passing through the boarding locations P2, P4, and P6 and alighting locations P3, P5, and P7 which are set by the users U1, U2, and U3 as the reservation information. Then, the driving plan of the vehicle V is created based on the calculated travel route. The vehicle V picks up the user U1 at the boarding location P2 at the boarding time t2, travels along the travel route R1 to move to the boarding location P4 by the boarding time t4, picks up the user U2, then travels along the travel route R2 to move to the boarding location P6 by the boarding time t6, and picks up the user U3. Subsequently, the vehicle travels along the travel route R3 to move to the alighting location P3 by the alighting time t3, makes the user U1 to alight, travels along the travel route R4 to move to the alighting location P5 by the alighting time t5, makes the user U2 alight, then travels through the travel route R5 to move to the alighting location P7 by the alighting time t7, and makes the user U3 to alight. When the driving plan is set in such a manner, the travel assistance device 1 transmits the use information of the vehicle V, such as the boarding locations, boarding times, alighting locations, and alighting times, to the terminal devices 2 of the users U1, U2, and U3 whose use reservations have been accepted. This allows the users U1, U2, and U3 to board the vehicle V from the boarding locations set as the reservation information and alight from the vehicle V at the alighting locations set as the reservation information.

Unfortunately, however, although no problem arises if these users U alight at the alighting locations as set in the reservation information, there are many cases in which a user U wants to alight at a stop location other than the alighting location, which has been reserved by the user U himself/herself, when passing through the alighting locations, which have been set by other users U, while heading for the reserved alighting location. For example, the user U may have to alight at a stop location before the reserved alighting location due to urgent call or may want to drop in at a facility near the alighting location set by another user U.

In such a case, if the user U who has alighted at a different alighting location than the reservation information does not return to the vehicle V after alighting, the vehicle V will be in a waiting state until the departure intention of the user U can be confirmed or the vehicle V will travel in a detour based on the initial driving plan even though it is no longer necessary to pass through the alighting location of the user U. In the travel assistance device 1 of the present embodiment, therefore, an unexpected user UI who has alighted at a stop location other than his/her reserved alighting location is identified, a confirmation notification is output to the unexpected user UI as to whether or not to board the vehicle V again, and a determination is made, based on an input from the unexpected user UI in response to the output confirmation notification, that the unexpected user UI will not board the vehicle V again. When the determination is made that the unexpected user UI will not board the vehicle V again, the vehicle V is started from the stop location. On the assumption as above, the travel assistance system S for a vehicle of the present embodiment will be described.

Figure 2:
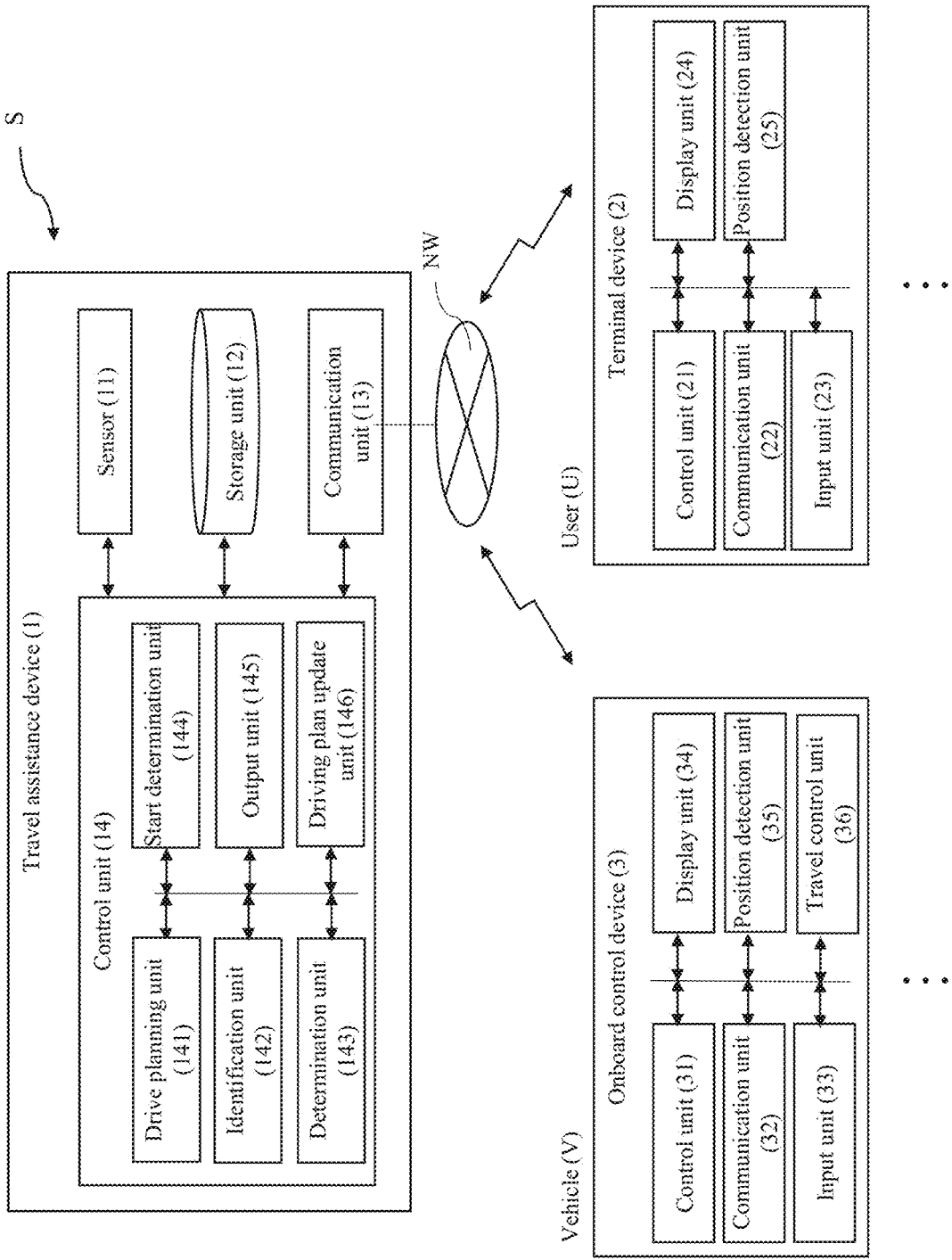
FIG. 2 is a block diagram illustrating a travel assistance system for a vehicle using travel assistance device and method for a vehicle according to the present invention.

FIG. 2 is a block diagram illustrating the travel assistance system S for a vehicle according to the present embodiment. As illustrated in FIG. 2, the travel assistance system S for a vehicle of the present embodiment includes a travel assistance device 1, a terminal device 2 carried by each of a plurality of users U, and an onboard control device 3 included in each of a plurality of vehicles V used by the plurality of users U. FIG. 2 illustrates only one terminal device 2 and one onboard control device 3, but the number of terminal devices 2 and onboard control devices 3 constituting the travel assistance system S for a vehicle of the present embodiment is not particularly limited.

The travel assistance device 1 includes a communication unit 13, the terminal device 2 includes a communication unit 22, the onboard control device 3 includes a communication unit 32, and they can mutually transmit and receive information via a telecommunication network NW such as the Internet. The communication path may be wired or wireless.

The terminal device 2 is a computer including a read only memory (ROM) that stores programs for vehicle reservation, a central processing unit (CPU) as an operation circuit that executes the programs stored in the ROM to execute each function, and a random access memory (RAM) that serves as an accessible storage device. The terminal device 2 may be a personal computer, a smart phone, a tablet terminal, a personal digital assistant (PDA), or other portable terminal device.

The terminal device 2 includes a control unit 21 that executes control processing for the use of a vehicle V by a user U, a communication unit 22 that performs communication with an external device such as the travel assistance device 1 or the onboard control device 3, an input unit 23 for the user U to input information such as a request for the use of a vehicle V, a display unit 24 for notifying the user U of the information, and a position detection unit 25 that detects the position of the terminal device 2.

The control unit 21 has a function for the user U to use a vehicle V. Specifically, the control unit 21 receives input information such as a use request for the use of a vehicle V by the user U and transmits the input information to the travel assistance device 1 via the communication unit 22. Such a use request includes a unique identifier of the user U (referred to as ID information, hereinafter), current positional information of the user U, and information on the boarding location, boarding time, number of passengers, alighting location, alighting time, etc. which are set by the user U.

For example, when the user U1 illustrated in FIG. 1 operates the input unit 23 to perform a reservation process to board the vehicle V at the boarding location P2 at the boarding time t2 and alight from the vehicle V at the alighting location P3 at the alighting time t3, the control unit 21 includes in the use request the positional information (latitude and longitude) of the boarding location P2, the boarding time t2, the positional information (latitude and longitude) of the alighting location P3, and the alighting time t3 and transmits the use request to the travel assistance device 1 via the communication unit 22. This allows the travel assistance device 1 to start the reservation process for the user U1 to use the vehicle V desired by the user U1. The reservation process for a vehicle V will be described later.

In addition, when the user U boards a vehicle V to start its use or when the user U alights from the vehicle V to finish its use, the control unit 21 communicates with the travel assistance device 1 and the onboard control device 3 via the communication unit 22 such as by near field wireless communication and executes an authentication process for the user U. The authentication process uses the ID information or the like of the user U output from the control unit 21 to determine whether or not the terminal device 2 used for the authentication operation is the terminal device 2 which has transmitted the use request.

The input unit 23 can use, for example, a touch panel arranged on a display screen or a joystick that allows the user U to perform manual input operation or a microphone or a voice recognition device that allows the user U to perform voice input. The display unit 24 may be a display or the like, and when a touch panel display is used, it can serve as both the display unit 24 and the input unit 23. The user U can transmit the ID information of the user U and information on the boarding location, boarding time, number of passengers, alighting location, alighting time, etc. to the travel assistance device 1 via the input unit 23.

The position detection unit 25, which may be a position detection device such as a so-called global positioning system (GPS) receiver, acquires the current positional information of the user U who operates the terminal device 2, and transmits the acquired positional information to the travel assistance device 1 via the communication unit 22. The positional information of the user U is used when creating a driving plan in the travel assistance device 1 and used for an alighting confirmation process for the user U, which will be described later.

The onboard control device 3 includes a control unit 31 that executes control processing for the use of a vehicle V by the users U, a communication unit 32 that performs communication with an external device such as the travel assistance device 1 or the terminal device 2, an input unit 33 for the users U to input information, a display unit 34 for notifying the users U of information, a position detection unit 35 composed of a GPS receiver or the like, and a travel control unit 36 that executes a travel control process for the vehicle V.

The control unit 31 transmits the current positional information of the vehicle V acquired using the position detection unit 35 to the travel assistance device 1 via the communication unit 32. Furthermore, the control unit 31 uses the display unit 34 such as a display to notify the users U on board of the information transmitted from the travel assistance device 1. The input unit 33 can use a button switch or a touch panel arranged on a display screen that allows the users U to perform manual input operation or a microphone or the like that allows the users U to perform voice input. When a touch panel display is used, it can serve as both the display unit 34 and the input unit 33.

When receiving the driving plan created by the travel assistance device 1 via the communication unit 32, the control unit 31 controls the travel control unit 36 based on the driving plan to make the vehicle V travel. The travel control unit 36 of the present embodiment has an autonomous travel control function. The autonomous travel control function is a function for the travel control unit 36 to autonomously control the travel of the subject vehicle without depending on the driver's operation. The autonomous travel control function of the travel control unit 36 includes an autonomous speed control function for autonomously controlling the travel speed of the subject vehicle and an autonomous steering control function for autonomously controlling the steering of the subject vehicle. The autonomous control without depending on the driver's operation may expansively include performing some operations by the driver. The autonomous travel control function of the travel control unit 36 is not an essential configuration of the present invention, and all the operations may be performed by the driver as necessary.

When a user U performs the authentication operation with the terminal device 2 upon the use of the vehicle V, the control unit 31 communicates with the travel assistance device 1 and the terminal device 2 via the communication unit 32 to execute the authentication process for the user U. When determining that the terminal device 2 used for the authentication operation is the terminal device 2 which has transmitted the use request, the control unit 31 allows the user U to board the vehicle V. When determining that the terminal device 2 used for the authentication operation is not the terminal device 2 which has transmitted the use request, the control unit 31 uses the display unit 34 or the like to notify that the vehicle V is not the vehicle reserved for the use by the user U. Likewise, when the user U performs the authentication operation with the terminal device 2 upon alighting from the vehicle U, the control unit 31 executes the authentication process for the user U.

The travel assistance device 1, which functions as a server of the travel assistance system S for a vehicle such as an unmanned taxi, includes a sensor 11 that detects information around the vehicle V, a storage unit 12 that stores information received by a communication unit, information regarding registered users U, information regarding reservations for use, information regarding the vehicle V, map data of the area in which the vehicle V travels (range of transport service), driving plans for the vehicle V, etc., a communication unit 13 that can mutually communicate with the terminal device 2 and the onboard control device 3, and a control unit 14 that executes control processing for managing and operating the system.

The sensor 11 detects a stop location at which the vehicle V stops and a user U who boards/alights at the stop location. For example, the sensor 11 is a camera that captures an image of each of the front, left and right sides, and rear of the subject vehicle, an onboard camera that captures an image of the interior of the subject vehicle, a sensor that detects a person who boards or alights from the subject vehicle, or the like. The vehicle is actually provided with such a sensor. The sensor 11 identifies the stop location at which the vehicle V is currently stopped from the information detected primarily by the front camera and the current positional information of the vehicle V received from the onboard control device 3 via the communication unit 13, and outputs the identified stop location to the identification unit 142.

In addition, the sensor 11 detects a user U who has alighted at the stop location at which the vehicle V is currently stopped from the information detected by the onboard camera, sensor, etc. and the current positional information of the user U received from the terminal device 2 via the communication unit 13. The sensor 11 identifies the ID information of the detected user U and outputs it to the identification unit 142. For example, when the user U performs the authentication operation with the terminal device 2 upon alighting from the vehicle U, the sensor 11 acquires via the communication unit 13 the ID information of the user U who performs the authentication operation, thereby identifying the ID information of the user U.

The storage unit 12 stores at least the vehicle information, the use reservation information received from the users U, and the driving plan of the vehicle V. Here, the vehicle information is information regarding each vehicle V and includes the ID information, vehicle type, number of possible passengers, remaining power capacity, failure information, etc. of the vehicle V. The use reservation information is information transmitted from the terminal device 2 for each user to use the vehicle V and includes the ID information of the user U and information indicating the boarding location, boarding time, number of passengers, alighting location, alighting time, etc. which are set by the user U. The driving plan of the vehicle V is created by an drive planning unit 141, which will be described later, and is stored together with map data including roads and buildings in the area in which the vehicle V travels while providing the transport service.

The control unit 14 includes a read only memory (ROM) that stores programs for executing processes for managing and assisting the transport service with vehicles V, a central processing unit (CPU) as an operation circuit that executes the programs stored in the ROM to serve as the travel assistance device 1, and a random access memory (RAM) that serves as an accessible storage device. The control unit 14 includes a drive planning unit 141, an identification unit 142, a determination unit 143, a start determination unit 144, an output unit 145, and a driving plan update unit 146, which execute the programs stored in the ROM thereby to achieve various functions such as a drive planning function, an alighting processing function, a start determination function, and a notification function.

The drive planning unit 141 receives a request for the use of a vehicle V from the terminal device 2 via the communication unit 13. As described above, such a request of the use of a vehicle V includes the ID information of a user U and information on the boarding location, boarding time, number of passengers, alighting location, alighting time, etc. which are set by the user U. The drive planning unit 141 performs the reservation process for the boarding location, boarding time, number of passengers, alighting location, and alighting time, which are set by the user U, in accordance with the use request transmitted from the terminal device 2.

For example, the drive planning unit 141 searches for an available vehicle V responsible for the boarding locations, boarding times, number of passengers, alighting locations, and alighting times desired by a plurality of users U. When there is an available vehicle V, in order to secure this vehicle V, the fact that the use reservation has been fixed is registered in the storage unit 12 together with the use request information received from each user U. At this time, the drive planning unit 141 calculates a travel route of the vehicle V that satisfies the wishes of each user U, and creates an driving plan including setting of the boarding location, boarding time, alighting location, and alighting time responsible for the use request from each user U. The driving plan unit 141 stores the created driving plan of the vehicle V in the storage unit 12.

When the driving plan unit 141 fixes the use reservations for the users U and sets the driving plan of the vehicle V, the output unit 145 in response to this transmits the driving plan of the vehicle V to the onboard control device 3 via the communication unit 13. The output unit 145 also transmits the use information of the vehicle V to the terminal device 2 of each user U via the communication unit 13. In the example of the user U1 illustrated in FIG. 1, the use information of the vehicle V transmitted from the output unit 145 to the terminal device 2 of the user U1 includes information indicating that the reservation for the use of the vehicle V by the user U1 has been fixed, the boarding location P2, boarding time t2, number of passengers, alighting location P3, and alighting time t3 of the user U1, etc.

When receiving the driving plan of the vehicle V, the onboard control device 3 controls the vehicle V in accordance with commands from the control unit 31 and the travel control unit 36 to start traveling to the boarding location P2 in time for the boarding time t2 set by the user U1 who boards first. The onboard control device 3 controls the vehicle V based on the driving plan while transmitting the current positional information of the vehicle V to the travel assistance device 1 using the position detection unit 35 and picks up the users U1, U2, and U3 at the boarding locations P2, P4, and P6, respectively, to transport them to the alighting locations set by the users U.

When the vehicle V stops at the alighting location set by a user U and confirms that the user U has alighted, the identification unit 142 and the determination unit 143 perform the alighting confirmation process for the user U who has alighted from the vehicle V at the stop location. First, the identification unit 142 searches the use reservation information stored in the storage unit 12 based on the ID information of the user U who has alighted, which is received from the sensor 11, and identifies the alighting location set by the user U. Subsequently, the stop location of the vehicle V received from the sensor 11 is checked with the identified alighting location of the user U, and a determination is made whether or not the user U has alighted in accordance with the use request. Then, when the user U who has alighted at the stop location of the vehicle V does not alight in accordance with the use request, the user is identified as an unexpected user UI. The unexpected user UI is a user U who has alighted at a stop location other than his/her alighting location set in the use request. It is called an unexpected user UI in the sense that the user has performed an unscheduled action.

Figure 3:
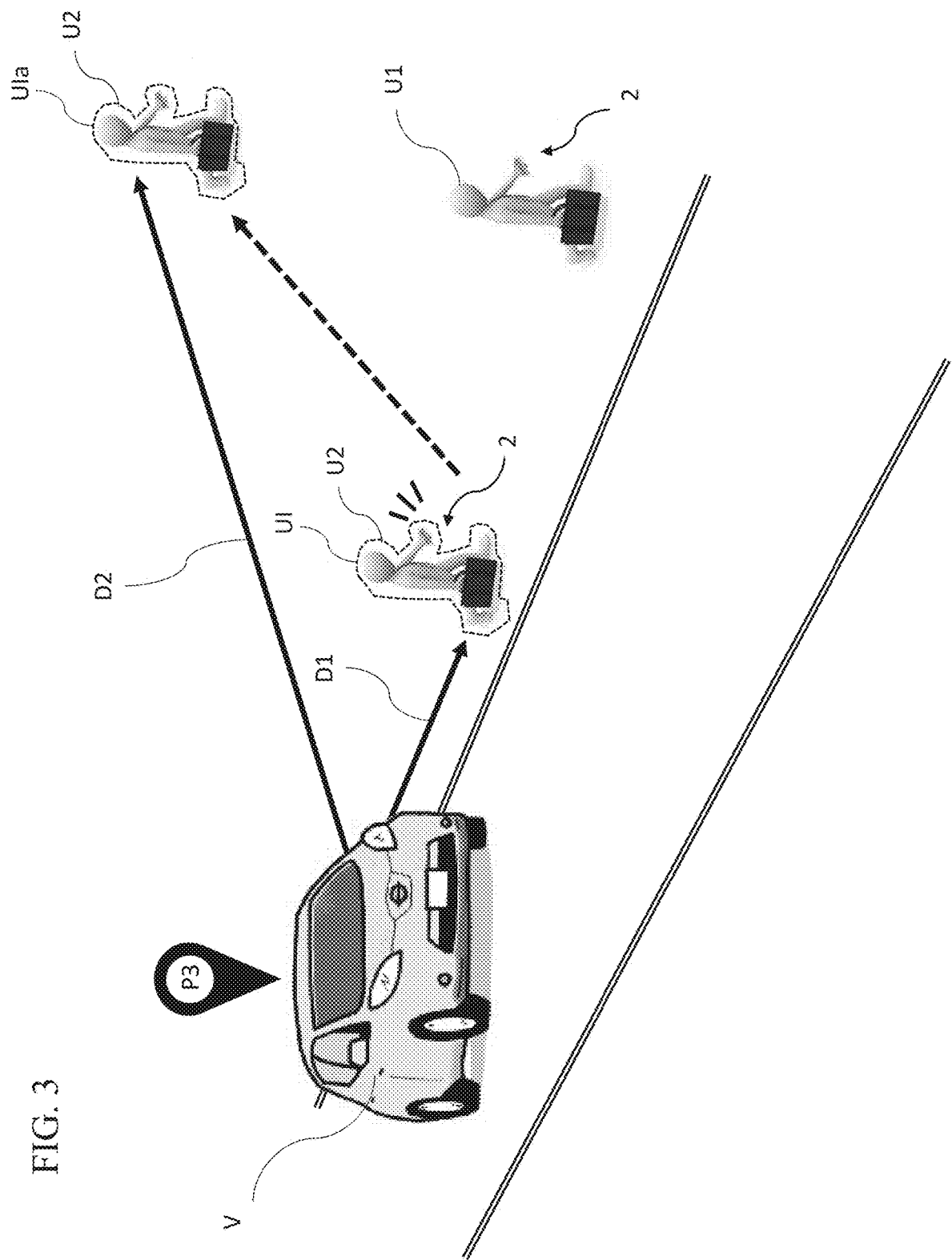
FIG. 3 is an explanatory diagram illustrating an example of a scene in which users who use the vehicle in FIG. 1 alight at a stop location.

FIG. 3 illustrates a scene in which the vehicle V stops at the alighting location P3 set by the user U1 illustrated in FIG. 1. In the scene illustrated in FIG. 3, for example, the identification unit 142 acquires information on the stop location of the vehicle V (alighting location P3) detected by the sensor 11 and the ID information of the users U1 and U2 who have alighted at the alighting location P3. The identification unit 142 identifies the alighting locations set by the users U1 and U2 in the use requests, from the ID information of the users U1 and U2 who have alighted. Here, regarding the user U1, the stop location of the vehicle V (alighting location P3) matches the alighting location P3 set by the user U1; therefore, the identification unit 142 determines that the user U1 has alighted in accordance with the use request, and confirms that the user U1 has alighted from the vehicle V. On the other hand, regarding the user U2, the stop location of the vehicle V (alighting location P3) does not match the alighting location P5 set by the user U2, and the identification unit 142 therefore determines that the user U2 has not alighted in accordance with the use request. Then, the identification unit 142 identifies the user U2 who has not alighted in accordance with the use request as an unexpected user UI. After identifying the unexpected user UI, the identification unit 142 transmits the ID information and use request information of the unexpected user UI to the determination unit 143. For additional information, FIG. 3 illustrates a scene in which the user U2 identified as the unexpected user UI moves as an unexpected user UIa from the position of a predetermined value D1 to the position of a predetermined value D2. The predetermined values D1 and D2 will be described later.

After the unexpected user UI is identified by the identification unit 142, the determination unit 143 executes control for confirming whether or not the unexpected user UI will board the vehicle V again. For example, the determination unit 143 transmits a confirmation notification as to whether or not to board the vehicle V again, to the terminal device 2 of the unexpected user UI via the output unit 145 and the communication unit 13. The present embodiment will be further described by applying an example in which the confirmation notification as to whether or not to board the vehicle V again is transmitted in a message form to the terminal device 2 or the onboard control device 3 and the unexpected user UI responds to this, but forms of the output of the confirmation notification and the input from the unexpected user UI may be those without using the terminal device 2 or other communication means, such as those outputting voice using a speaker provided in the vehicle or displaying characters on a display.

As in the scene illustrated in FIG. 3, when the unexpected user UI has moved away from the vehicle V by a predetermined value D1 or more, the determination unit 143 transmits a re-boarding confirmation notification as to whether or not to board the vehicle V again. Although the predetermined value D1 is not particularly limited, it is preferred to represent a certain distance, such as 1.5 meters from the vehicle V, for example. This is because the unexpected user UI may feel annoyed if the re-boarding confirmation notification is sent each time even when the user U2 identified as the unexpected user UI temporarily alights, such as when the user U2 gives up his/her seat for another user U (user U1 herein) to alight or when the user U2 picks up a fallen object outside the vehicle.

Figure 4A:
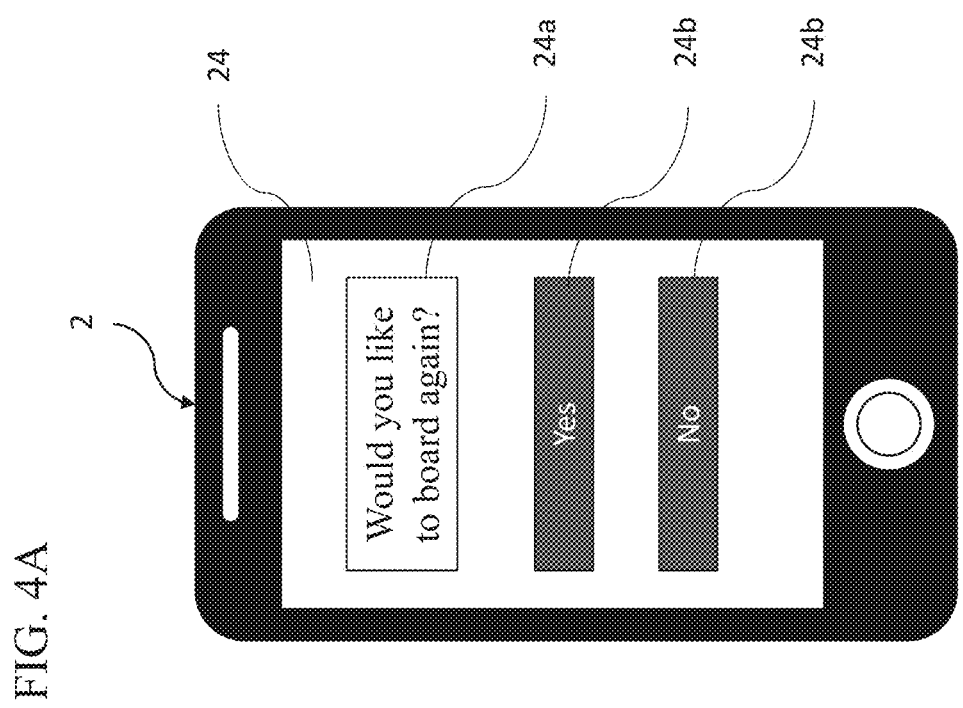
FIG. 4A is a diagram illustrating an example of the display screen of a terminal device carried by a user.

FIG. 4A is a diagram illustrating an example of a display screen displaying the re-boarding confirmation notification on the terminal device 2 of the unexpected user UI. The display example illustrated in FIG. 4A represents an image displayed on the display of the terminal device 2 carried by the user U2 identified as the unexpected user UI in the scene illustrated in FIG. 3. The form of the display image is not particularly limited, but for example, a query sentence 24a such as "Would you like to board again?" and response button sections 24b to this, such as "Yes/No" for confirming the intention of the user U2, are displayed. By transmitting this display information to the terminal device 2, it is possible to confirm the intention of the unexpected user UI as to whether or not to board the vehicle V again. That is, the unexpected user UI indicates the intention of whether or not to board the vehicle V again, by selecting one of the response button sections 24b of "Yes/No." When the unexpected user UI selects one of the response button sections 24b of "Yes/No," input information from the unexpected user UI is received by the determination unit 143 via the communication unit 13.

The determination unit 143 may transmit the re-boarding confirmation notification to the onboard control device 3 of the vehicle V. FIG. 4B is a diagram illustrating an example of a display screen displaying the re-boarding confirmation notification on the onboard control device 3 of the vehicle V. The display example illustrated in FIG. 4B represents an image displayed on the display 34 provided, for example, near a door of the vehicle V which is stopped at the alighting location P3 in the scene illustrated in FIG. 3. When the user U2 identified as the unexpected user UI alights from the vehicle V, the determination unit 143 controls the display 34 to display the re-boarding confirmation notification. When the re-boarding confirmation notification is displayed before the unexpected user UI leaves the vehicle V, it is possible to alert the unexpected user UI about to alight by mistake at a different alighting location than the use request.

The form of the display image displayed on the display 34 is not particularly limited, but as in the display information for the terminal device 2 carried by the unexpected user UI, for example, a query sentence 34a such as "Would you like to board again?" and response button sections 34b to this, such as "Yes/No" for confirming the intention of the user U2, are displayed. The unexpected user UI indicates the intention of whether or not to board the vehicle V again, by selecting one of the response button sections 34b of "Yes/No." When the unexpected user UI selects one of the response button sections 34b of "Yes/No," input information from the unexpected user UI is received by the determination unit 143 via the communication unit 13.

The re-boarding confirmation notification may be displayed on either the terminal device 2 carried by a user U or the onboard control device 3 of the vehicle V or may also be displayed on both the terminal device 2 and the onboard control device 3. Additionally or alternatively, the re-boarding confirmation notification may be displayed on a plurality of terminal devices 2 as necessary, such as when a plurality of persons are reserved for use to the use request from one user U. This allows for appropriate display of the confirmation notification to the unexpected user or users UI as to whether or not to board the vehicle V again.

The form of the display screen for confirming whether or not to board the vehicle V again may be composed only of response button sections or the like for confirming the intention of the unexpected user UI, such as "I will board again./I will not board again." or may also be composed of content prompting the unexpected user UI to take a specific action, etc., such as "Please tap the screen if you board again." The method of confirming the intention of the unexpected user UI may be designed to press an icon displayed on the display or designed to perform voice input using a microphone or the like.

When the input information from the unexpected user UI is not received for a predetermined period of time in response to the re-boarding confirmation notification, the determination unit 143 may assume that the unexpected user UI has no intention to board the vehicle V again and may determine that the unexpected user UI will not board the vehicle V again. Although the predetermined period of time is not particularly limited, it may be a period of time at least for the unexpected user UI to complete alighting from the vehicle V, such as 3 minutes. This can shorten the time for the alighting process executed for the unexpected user UI.

Figure 5:
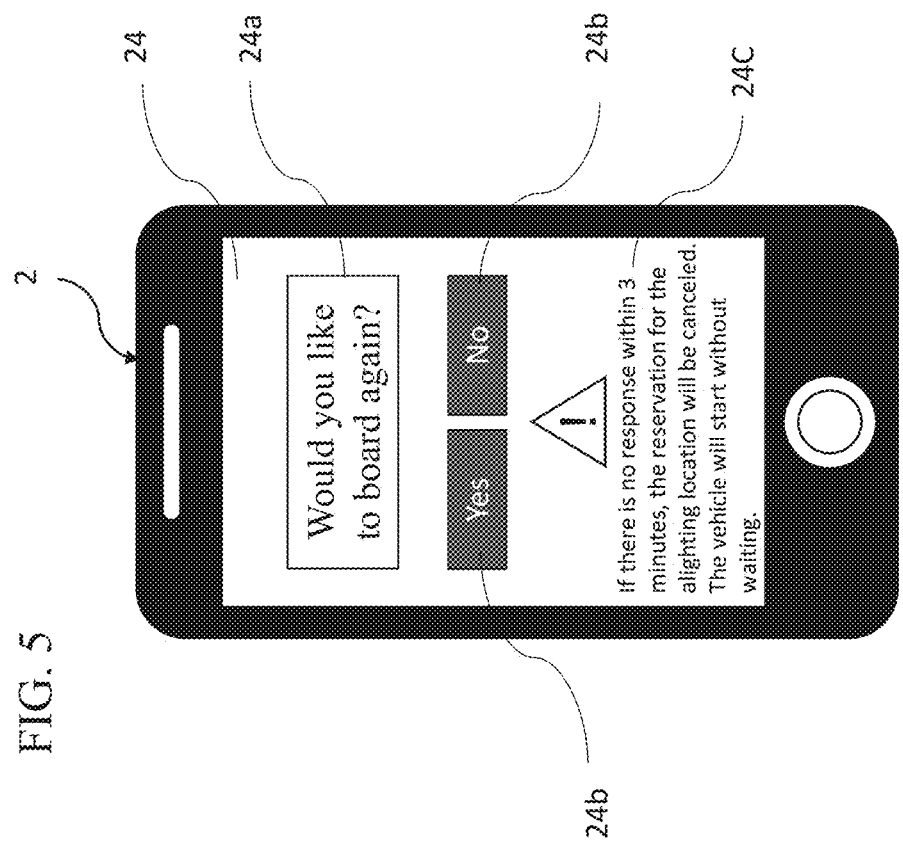
FIG. 5 is a diagram illustrating another example of the display screen of a terminal device carried by a user.

There may be cases in which the input information from the unexpected user UI is not received in response to the re-boarding confirmation notification, that is, no response can be obtained from the unexpected user UI, and the form of the display screen may therefore include displaying control information in the case of no response together with the re-boarding confirmation notification. For example, as illustrated in FIG. 5, a content 24*c* to call attention, such as "If there is no response within 3 minutes, the reservation for the alighting location will be canceled. The vehicle will start without waiting.," may be displayed together with the query sentence 24*a* such as "Would you like to board again?" and the response button sections 24*b* such as "Yes/No" for confirming the intention of the user U2.

Figure 6B:
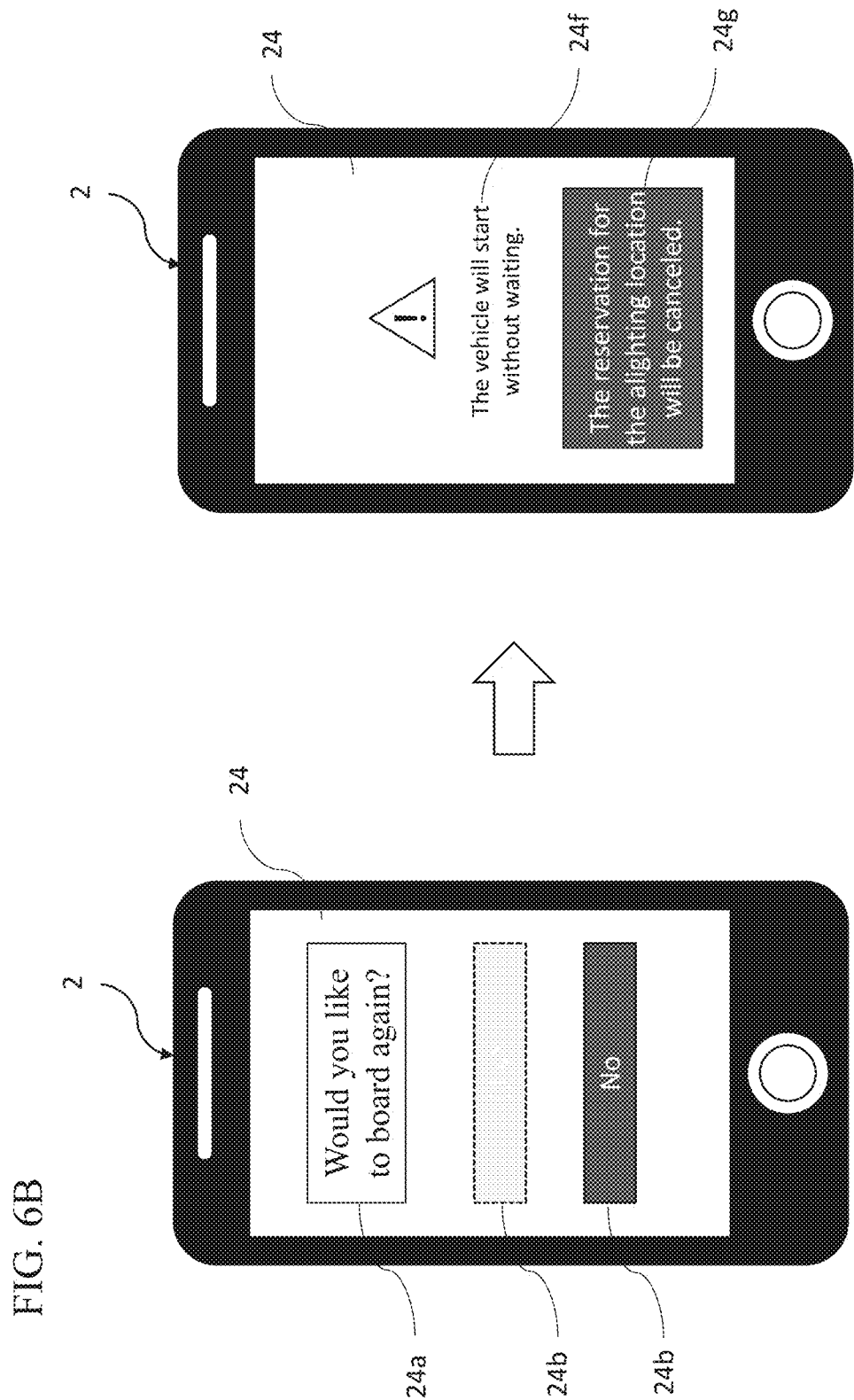
FIG. 6B is a diagram (part 2) illustrating still another example of the display screen of the terminal device carried by the user.

Additionally or alternatively, when the distance between the vehicle V and the unexpected user UI is a predetermined value D2 or more, the determination unit 143 may assume that the unexpected user UI has no intention to board the vehicle V again and may determine that the unexpected user UI will not board the vehicle V again. This is because when the unexpected user UI has moved away from the vehicle V by a considerable distance, the unexpected user UI may not return to the vehicle V even within a predetermined period of time. The predetermined value D2 is not particularly limited, but is larger than the predetermined value D1 as in the scene illustrated in FIG. 3, and preferably represents a certain distance that enables a determination that the unexpected user UI does not alight temporarily, such as 30 meters from the vehicle V. When the distance between the vehicle V and the unexpected user UI is the predetermined value D2 or more and a determination is thus made that the unexpected user UI will not board the vehicle V again, a reservation cancellation display 24*g* such as "The reservation for the alighting location will be canceled." is displayed together with a content 24*f* to call attention, such as "The vehicle will start without waiting.," as in the scene in which the unexpected user UI selects "No" of the response button sections 24*b* in response to the query sentence 24*a* "Would you like to board again?" as illustrated in FIG. 6B.

Such display information allows the determination unit 143 to determine whether or not the unexpected user UI will board the vehicle V again even when there is a reply from the unexpected user UI or there is no clear reply in response to the re-boarding confirmation notification. Furthermore, when there is no reply from the unexpected user UI within a predetermined period of time in response to the re-boarding confirmation notification or when the distance between the vehicle V and the unexpected user UI is the predetermined value D2 or more, a determination is made that the unexpected user UI will not board the vehicle V again, and display is made that the vehicle will be started, thereby calling attention to the unexpected user UI. The determination result as to whether or not the unexpected user UI will board the vehicle V again is output to the start determination unit 144.

When determining that the unexpected user UI will board the vehicle V again, the determination unit 143 calculates a possible waiting time of the vehicle V. The possible waiting time is a period of time during which the vehicle V can wait at a stop location. Specifically, it is a period of time from when a determination is made that the unexpected user UI will board the vehicle V again until when the user actually boards the vehicle V again. The possible waiting time is not particularly limited, but may be set to a predetermined period of time such as 3 minutes. In addition, the distance between the vehicle V and the unexpected user UI may be detected, and from the distance and the walking speed of the unexpected user UI, an approximate time required for the unexpected user UI to return to the vehicle V from the current location may be calculated to update the possible waiting time. The determination unit 143 outputs information on the possible waiting time to the start determination unit 144 together with the result of determination that the unexpected user UI will board the vehicle V again.

When receiving the information on the possible waiting time from the determination unit 143, the start determination unit 144 transmits the information on the possible waiting time to the terminal device 2 carried by the unexpected user UI via the output unit 145 and the communication unit 13.

FIG. 6A is a diagram illustrating an example of the display screen when information is input from the unexpected user UI for the display information of FIG. 4A. The left diagram of FIG. 6A represents a scene in which the unexpected user UI selects "Yes" of the response button sections 24*b* in response to the query sentence 24*a* "Would you like to board again?" As illustrated in the right diagram of FIG. 6A, for example, the terminal device 2 displays a scheduled departure time 24*d* at which the vehicle V will depart from the current stop location and temporal information 24*e* such as "Possible waiting time" and "Remaining 5 minutes." This allows the unexpected user UI to confirm the temporal information for the unexpected user UI to board the vehicle V again.

Additionally or alternatively, the start determination unit 144 transmits the information on the possible waiting time to the onboard control device 3 via the output unit 145 and the communication unit 13. In response to this, the onboard control device 3 controls the vehicle V in accordance with command signals from the control unit 31 and the travel control unit 36 and keeps the vehicle V stopped at the stop location until the set possible waiting time elapses.

On the other hand, when determining that the unexpected user UI will not board the vehicle V again, the determination unit 143 outputs the information on the alighting location and alighting time, which are set by the unexpected user UI in the use request, to the driving plan update unit 146. In response to this, the driving plan update unit 146 deletes the information on the alighting location and alighting time of the unexpected user UI, who will not board the vehicle V again, from the driving plan of the vehicle V, and calculates a new driving plan of the vehicle V. The case in which the unexpected user UI will not board the vehicle V again refers specifically to a case in which a reply that "I will not board again." is received from the unexpected user UI in response to the re-boarding confirmation notification, a case in which there is no reply from the unexpected user UI within a predetermined period of time in response to the re-boarding confirmation notification, or a case in which the distance between the vehicle V and the unexpected user UI is the predetermined value D2 or more. Thus, whether or not to board again can be determined based on the actual movement of the unexpected user UI thereby to appropriately determine a case in which the unexpected user UI will not board the vehicle again.

In the scene illustrated in FIG. 3, when the user U2 identified as the unexpected user UI will not board the vehicle V again, the information on the alighting location P5 and alighting time t5 set by the user U2 in the use request is deleted from the driving plan. At this time, as illustrated in FIG. 1, the travel routes R4 and R5 passing through the alighting location P5 are deleted, and a new travel route R6 from the alighting location P3 of the user U1 to the alighting location P7 of the user U3 is set, and the arrival time at the alighting time t7 is calculated. This is reflected in the driving plan of the vehicle V originally created, and the driving plan is updated. Through this operation, even when there is an unexpected user UI who will not board the vehicle V again, the travel energy corresponding to that in the case of traveling through the alighting location of the unexpected user UI can be reduced. The driving plan update unit 146 outputs this updated new driving plan to the start determination unit 144 together with the result of determination that the unexpected user UI will not board the vehicle V again.

The setting of a new driving plan by the driving plan update unit 146 is not an essential configuration of the present invention, and may be omitted as necessary. For example, only the setting of the request for use at the alighting location P5 and alighting time t5 for the user U2 identified as the unexpected user UI may be canceled, and the originally created driving plan for traveling along the routes R4 and R5 may be used without any modification. In this case, the calculation load for calculating the driving plan can be reduced.

The start determination unit 144 transmits the new driving plan to the onboard control device 3 via the output unit 145 and the communication unit 13. In response to this, the onboard control device 3 controls the autonomous travel of the vehicle V in accordance with the command signals from the control unit 31 and the travel control unit 36 to allow the vehicle V to travel based on the updated driving plan.

When receiving the information on the alighting location and alighting time of the unexpected user UI deleted from the driving plan, the start determination unit 144 transmits a notification that the reservation of the alighting location and alighting time set in the use request is canceled, to the terminal device 2 carried by the unexpected user UI via the output unit 145 and the communication unit 13.

The left diagram of FIG. 6B represents a scene in which the unexpected user UI selects "No" of the response button sections 24b in response to the query sentence 24a "Would you like to board again?" As illustrated in the right diagram of FIG. 6B, for example, the reservation cancellation display 24g such as "The reservation for the alighting location will be canceled." is displayed together with the content 24f to call attention, such as "The vehicle will start without waiting."

When a determination is made that the unexpected user UI will not board the vehicle V again, a possible waiting time that is shorter than the possible waiting time in the case of determining that the unexpected user UI will board the vehicle V again, for example, 2 minutes, may be set, and after the possible waiting time has elapsed, the information on the alighting location and alighting time of the unexpected user UI may be deleted from the driving plan, and the reservation cancellation display 24g may be displayed. Alternatively, the information on the alighting location and alighting time of the unexpected user UI may be immediately deleted from the driving plan without providing the possible waiting time of the vehicle V, and the reservation cancellation display 24g may be displayed. It is thereby possible to set an appropriate possible waiting time in accordance with the content of the reply from the unexpected user UI in response to the confirmation notification as to whether or not to board the vehicle V again.

Additionally or alternatively, the start determination unit 144 performs notification of the use information update to a user U whose reservation of the alighting time set in the use request is changed by a predetermined period of time or more due to the setting of the new driving plan. Although the predetermined period of time is not particularly limited, it is preferably a certain amount of time such as 5 minutes. This is because the user U does not necessarily need the notification of a short period of time such as 1 minute or 2 minutes. If necessary, the notification of the use information update may be omitted. The start determination unit 144 transmits the updated estimated time of arrival at the alighting location to the terminal device 2 of the user U via the output unit 145 and the communication unit 13.

Figure 7:
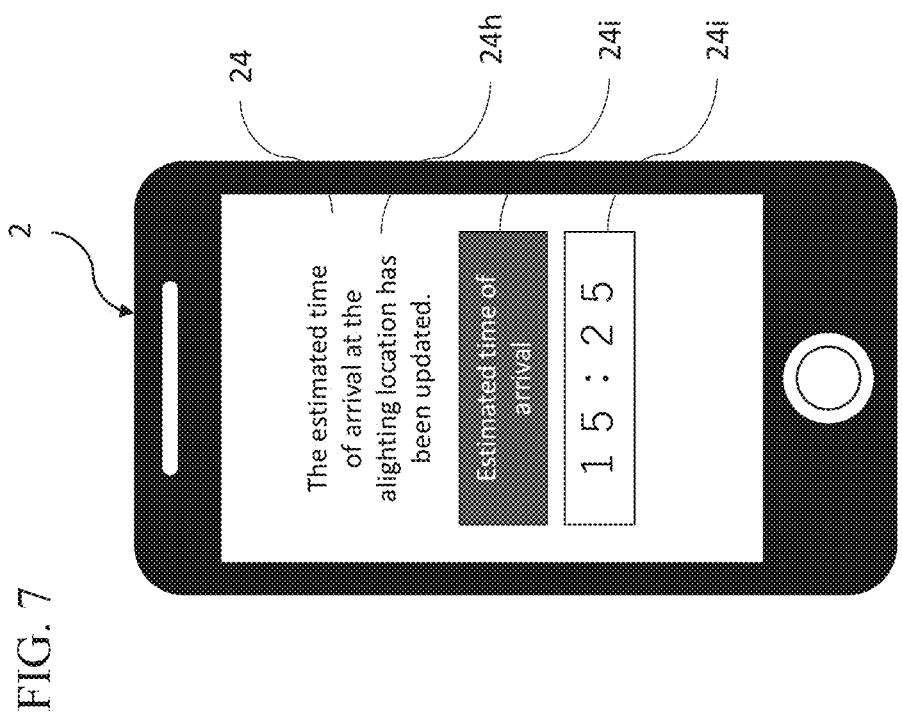
FIG. 7 is a diagram illustrating yet another example of the display screen of a terminal device carried by a user.

The display example illustrated in FIG. 7 is an image displayed on the display of the terminal device 2 carried by the user U3, in which the alighting time t7 is changed due to the setting of a new driving plan (travel route R6) in the scene illustrated in FIG. 1. The form of the display image is not particularly limited, but for example, a display 24i of the estimated time of arrival of the vehicle V at the alighting location P7 is displayed on the terminal device 2 together with update information 24h such as "The estimated time of arrival at the alighting location has been updated." Through this operation, the user whose alighting time has been updated due to the setting of a new driving plan can confirm the change status of the use information.

When receiving the determination result as to whether or not the unexpected user UI will board the vehicle V again, the start determination unit 144 executes control for starting the vehicle V again in accordance with the determination result. For example, the start determination unit 144 transmits a notification for confirming the departure intention of users U to the onboard control device 3 via the output unit 145 and the communication unit 13. More specifically, when the determination unit 143 determines that the unexpected user UI will board the vehicle V again and sets the possible waiting time of the vehicle V, the start determination unit 144 executes, after the possible waiting time has elapsed, a departure intention confirmation process for the unexpected user UI and other users U who remain in the vehicle V. On the other hand, when the determination unit 143 determines that the unexpected user UI will not board the vehicle V again and sets a new driving plan, the start determining unit 144 executes the departure intention confirmation process for the users U who remain in the vehicle.

Figure 8:
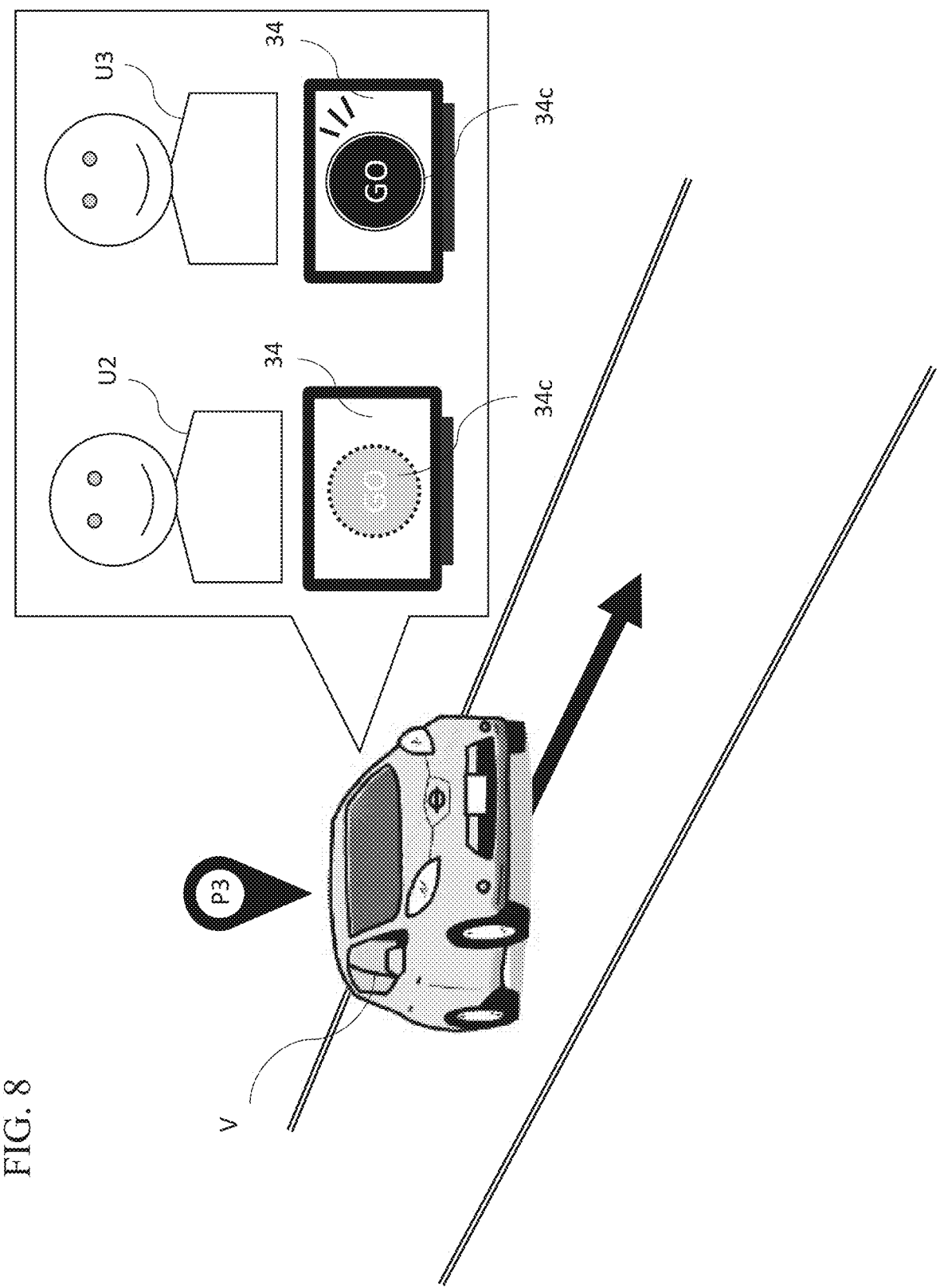
FIG. 8 is an explanatory diagram illustrating an example of a scene in which the stopped vehicle in FIG. 1 starts from the stop location.

FIG. 8 is a diagram illustrating an example of a display screen displaying a departure intention confirmation notification for confirming the departure intention of the users U on the onboard control device 3 of the vehicle V. The display example illustrated in FIG. 8 represents an image displayed on the display 34 provided, for example, near a seat of the vehicle V about to start from the stop location (alighting location P3) in the scene illustrated in FIG. 3.

The form of the display image displayed on the display 34 is not particularly limited, but for example, an icon 34c indicating the departure intention is displayed. The users U2 and U3 on board the vehicle V press the icon 34c to indicate their intention to permit the vehicle V to start. When the users U2 and U3 on board the vehicle V press the icon 34c indicating the departure intention, the input information from the users U2 and U3 is output to the start determination unit 144 via the communication unit 13. In the scene illustrated in FIG. 8, the user U2 identified as the unexpected user UI does not press the icon 34c and does not indicate the departure intention. On the other hand, the user U3 who will remain in the vehicle V presses the icon 34c to indicate the departure intention.

In response to the departure intention confirmation notification, when both the users U2 and U3 on board the vehicle V indicate their departure intention, the start determination unit 144 transmits a command to permit the start of the vehicle V to the onboard control device 3 via the output unit 145 and the communication unit 13. Then, in response to this, the onboard control device 3 autonomously controls travel of the vehicle V to start it from the stop location (alighting location P3). This allows for confirmation of the departure intention of the users U on board the vehicle V, and the vehicle V can be started with consideration for safety.

In the departure intention confirmation process for the users U, it is sufficient to confirm the departure intention of the users U on board the vehicle V, so examples of the process may include displaying the departure intention confirmation notification on the terminal device 2 and making a determination, instead of the notification, by pressing a button switch provided inside the vehicle V or detecting the use status of the seat belts in the vehicle V, the door lock status, etc.

In the departure intention confirmation process for the users U, the departure intention of all the users U on board the vehicle V may be confirmed, or only the unexpected user UI may be targeted. For example, in the scene illustrated in FIG. 8, the start determination unit 144 executes the departure intention confirmation process for the user U2 identified as the unexpected user UI. This is because if the departure intention is confirmed for the user U3 on board the vehicle V each time the confirmation is needed, the user U3 may feel annoyed. In this case, the start determination unit 144 can substitute the input of departure intention, for example, with an authentication processing operation when the user U2 boards the vehicle V again.

The departure intention confirmation process for the users U is not an essential configuration of the present invention, and may be omitted as necessary. For example, when the determination unit 143 determines that the unexpected user UI will not board the vehicle V again, or when the unexpected user UI does not return to the vehicle V even after the possible waiting time of the vehicle V has elapsed, the start determining unit 144 transmits to the onboard control device 3 a command to permit the vehicle V to start. This can shorten the waiting time of the vehicle V to suppress the waste of energy of the vehicle, and the transport service for the users U on board the vehicle V can be smoothly performed.

Figure 9:
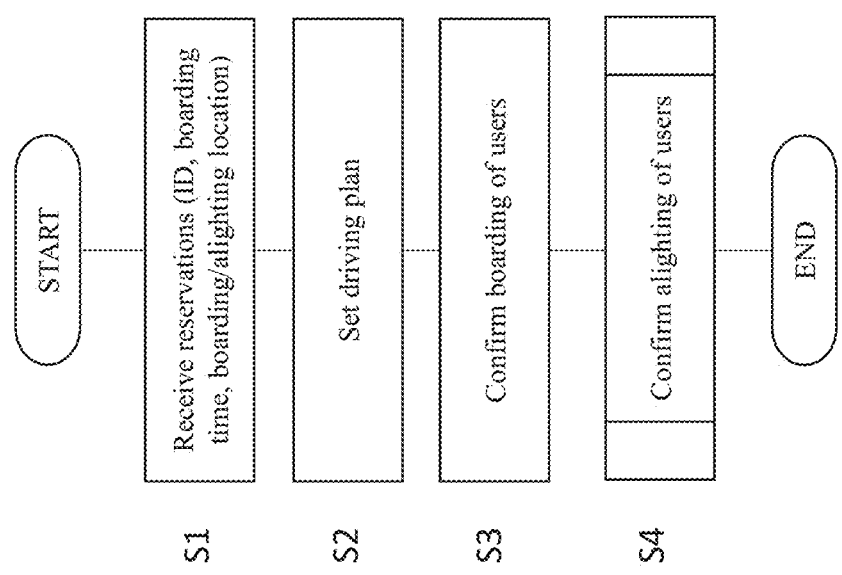
FIG. 9 is a flow chart illustrating an example of control processing executed by the travel assistance device of FIG. 2.
Figure 10:
FIG. 10 is a flowchart illustrating an example of a subroutine executed in step S4 of FIG. 9.
Figure 11:
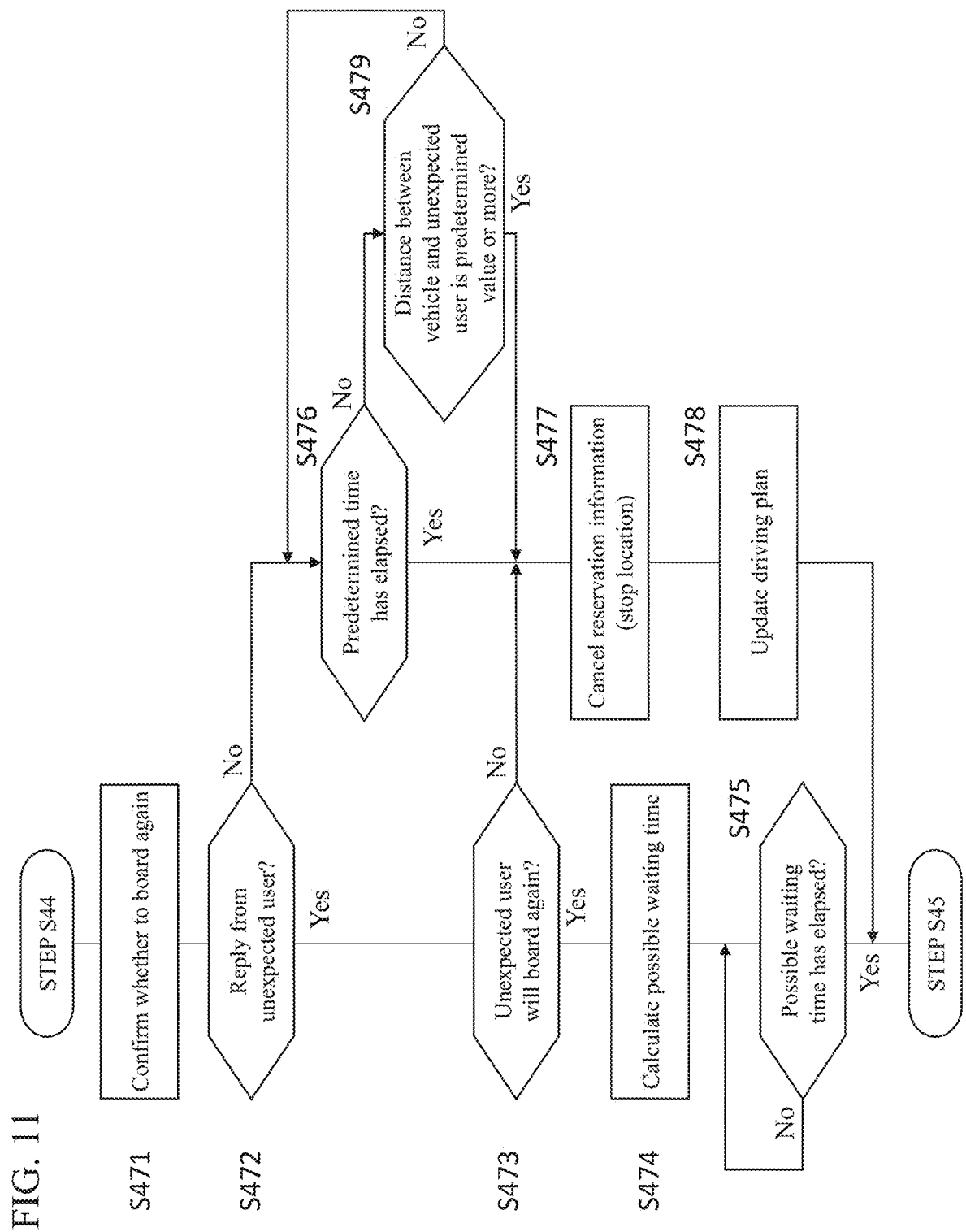
FIG. 11 is a flowchart illustrating an example of a subroutine executed in step S47 of FIG. 10.

Control processing for the transport service executed by the travel assistance device 1 will now be described with reference to the scene illustrated in FIG. 1. FIGS. 9 to 11 are flowcharts illustrating an example of the travel assistance control processing executed by the travel assistance device 1. FIG. 9 illustrates the basic control processing, FIG. 10 illustrates the subroutine of step S4 of FIG. 9, and FIG. 11 illustrates the subroutine of step S47 of FIG. 10.

The control processing described below is executed by the travel assistance device 1 at predetermined time intervals. In the following description, it is assumed that the vehicle V is under autonomous travel control executed using the autonomous travel control function of the onboard control device 3.

In step S1 of FIG. 9, the travel assistance device 1 receives the vehicle use reservations from a plurality of users U1, U2, and U3. The use reservation information from the users U includes at least ID information of the users U and information on the boarding locations, boarding times, and alighting locations set by the users U. When the use reservations are fixed, the process proceeds to step S2.

In step S2, the drive planning unit 141 extracts a vehicle V that satisfies the wishes of the users U, and creates the driving plan including the travel route of the vehicle V and the boarding locations, boarding times, alighting locations, and alighting times of the users U. The vehicle V is controlled to autonomously travel based on the driving plan and heads for the boarding locations at the boarding times set by the users U1, U2, and U3.

In step S3, the travel assistance device 1 executes confirmation that the users U have boarded the vehicle. Regarding the user U1, when the vehicle V arrives at the boarding location P2 set by the user U1, the travel assistance device 1 executes the authentication process for the user U1 using the terminal device 2 carried by the user U1. When the authentication process is completed, the user U1 is allowed to board the vehicle V. In the subsequent step S4, the travel assistance device 1 executes the alighting confirmation process for the users U, which will be described later.

In step S4 of FIG. 9, the processing illustrated in FIG. 10 is executed as a process of executing alighting confirmation for the users U. This alighting confirmation process for the users U will be described with reference to FIGS. 1, 3, and 8. First, in step S41, the sensor 11 detects the alighting location P3 illustrated in FIG. 3 as the stop location of the vehicle V. In the subsequent step S42, the sensor 11 detects the users U1 and U2 who have alighted from the vehicle V at the stop location (alighting location P3), and identifies the ID information of the users U1 and U2.

In step S43, the identification unit 142 searches the use reservation information stored in the storage unit 12 using the ID information of the users U1 and U2 who have alighted from the vehicle V at the alighting location P3, and identifies the alighting locations set by the users U1 and U2. Step S43 is followed by step S44.

In step S44, the identification unit 142 determines whether or not the users U1 and U2 who have alighted at the alighting location P3 alight in accordance with the use requests. As for the user U1, the stop location (alighting location P3) of the vehicle V matches the alighting location P3 set by the user U1, so the identification unit 142 determines that the user U1 has alighted in accordance with the use request, and the process proceeds to step S45. On the other hand, as for the user U2, the stop location (alighting location P3) of the vehicle V does not match the alighting location P5 set by the user U2. The identification unit 142 therefore determines that the user U2 has not alighted in accordance with the use request, and identifies the user U2 as the unexpected user UI. In this case, step S44 is followed by step S47. In step S47, control for the alighting process for the unexpected user UI is executed, which will be described later.

When step S44 results in a determination that a user U has alighted from the vehicle V in accordance with the use request, or when step S47 results in execution of the alighting process for an unexpected user U, the start determination unit 144 confirms in step S45 the departure intention of users U on board the vehicle V. The scene illustrated in FIG. 8 represents the processing of step S45 in which the alighting process for the unexpected user UI to be described below has been executed in step S47, that is, the processing of steps S471 to S475 illustrated in FIG. 11 has been executed. The start determination unit 144 transmits the departure intention confirmation notification to the user U2, who boards the vehicle V again, and the user U3 who remains in the vehicle V. When both the users U2 and U3 indicate their departure intention, the process proceeds to step S46, in which the vehicle V is started from the stop location (alighting location P3). When at least one of the users U2 and U3 does not indicate the departure intention, step S45 is repeated for a predetermined period of time until both the users U2 and U3 are confirmed to have their departure intention.

In step S47 of FIG. 10, the process of executing alighting confirmation for the unexpected user UI, or the processing illustrated in FIG. 11, is executed. First, in step S471, when the user U2 identified as the unexpected user UI illustrated in FIG. 3 moves away from the vehicle V by the predetermined value D1 or more, the determination unit 143 transmits the confirmation notification as to whether or not to board the vehicle V again. In the subsequent step S472, a determination is made whether or not there is a reply from the unexpected user UI in response to the re-boarding confirmation notification. When there is a reply in response to the re-boarding confirmation notification, the process proceeds to step S473. On the other hand, when there is no reply, the process proceeds to step S476.

When step S472 results in a determination that there is no reply from the unexpected user UI in response to the re-boarding confirmation notification, the determination unit 143 determines in step S476 whether or not a predetermined period of time, such as predetermined three minutes, has elapsed. When the predetermined period of time has elapsed, a determination is made that the unexpected user UI does not have intention to board the vehicle V again and thus will not board the vehicle again, and the process proceeds to step S477. On the other hand, when the predetermined period of time has not elapsed, the process proceeds to step S479, in which a determination is made whether or not the distance between the vehicle V and the unexpected user UI is the predetermined value D2 or more. When the distance between the vehicle V and the unexpected user UI is the predetermined value D2 or more, a determination is made that the unexpected user UI does not have intention to board the vehicle V again and thus will not board the vehicle V again, and the process proceeds to step S477. When the distance between the vehicle V and the unexpected user UI is less than the predetermined value D2, the process returns to step S476, and the subsequent processes are repeated.

When step S472 results in a determination that there is a reply from the unexpected user UI in response to the re-boarding confirmation notification, the determination unit 143 determines in step S473 whether or not the unexpected user UI will board the vehicle V again. When a determination is made that the unexpected user UI will board the vehicle V again, the process proceeds to step S474. On the other hand, when a determination is made that the unexpected user UI will not board the vehicle V again, the process proceeds to step S477.

When step S473 results in a determination that the unexpected user UI will board the vehicle V again, the start determination unit 144 calculates the possible waiting time of the vehicle V in step S474 and notifies the unexpected user UI of the possible waiting time. In the subsequent step S475, a determination is made whether or not the possible waiting time has elapsed, and when the possible waiting time has elapsed, the process proceeds to step S45. Step S475 is repeated until the possible waiting time elapses.

On the other hand, when a determination is made in step S476 that the predetermined period of time has elapsed and the unexpected user UI will not board the vehicle V again, or when a determination is made in step S479 that the unexpected user UI will not board the vehicle V again because the distance between the vehicle V and the unexpected user UI is the predetermined value D2 or more, or when step S473 results in a determination that the unexpected user UI will not board the vehicle V again, the information on the alighting location and alighting time of the unexpected user UI is deleted from the driving plan of the vehicle V in step S477. In the subsequent step S478, the driving plan update unit 146 calculates a new driving plan of the vehicle V, and the process proceeds to step S45. The start determination unit 144 notifies the users U, whose scheduled alighting time is changed by a predetermined time or more according to the new driving plan, that the use information is updated. When a new driving plan of the vehicle V is set, the vehicle V is controlled to autonomously travel based on this new driving plan.

As described above, according to the travel assistance device 1, travel assistance system, and travel assistance method for a vehicle of the present embodiment, the reservation information including at least the ID information and alighting locations of the users U is stored, at least a stop location of the vehicle V and the unique identifiers (ID information) of the users who board or alight from the vehicle V are detected, and an unexpected user UI who has alighted at the stop location other than his/her alighting location included in the reservation information is identified based on the detected stop location of the vehicle V, the unique identifiers (ID information) of the users U who have alighted at the stop location, and the unique identifiers (ID information) and alighting locations of the users U included in the stored reservation information. Then, the confirmation notification is output to the unexpected user as to whether or not to board the vehicle again and a determination is made, based on an input from the unexpected user UI in response to the output confirmation notification, that the unexpected user UI will not board the vehicle V again. When the determination is made that the unexpected user UI will not board the vehicle V again, the start permission information is output for starting the vehicle V from the stop location. Through this operation, even when there is a user who has alighted at a location other than the reserved alighting location, the vehicle is started, provided that the user will not board the vehicle again, and the waste of energy can therefore be suppressed.

Moreover, according to the travel assistance device 1, travel assistance system, and travel assistance method for a vehicle of the present embodiment, the vehicle V has the travel control unit 36 that executes autonomous travel control, and the output unit 145 outputs the start permission information to the travel control unit 36; therefore, the vehicle V can be smoothly controlled by autonomous traveling.

Furthermore, according to the travel assistance device 1, travel assistance system, and travel assistance method for a vehicle of the present embodiment, the determination unit 143 outputs the confirmation notification as to whether or not to board the vehicle V again, to the vehicle V or the terminal device 2 carried by the unexpected user UI, and the confirmation notification can therefore be appropriately displayed for the unexpected user UI.

In addition, according to the travel assistance device 1, travel assistance system, and travel assistance method for a vehicle of the present embodiment, when the distance between the vehicle V and the unexpected user UI is a first predetermined value or more, the determination unit 143 outputs the confirmation notification as to whether or not to board the vehicle V again, and it is therefore possible to suppress transmission of the confirmation notification even when the user temporarily alights from the vehicle.

Moreover, according to the travel assistance device 1, travel assistance system, and travel assistance method for a vehicle of the present embodiment, when there is an input from the unexpected user UI in response to the confirmation notification that the unexpected user UI will not board the vehicle V again, or when there is no input from the unexpected user UI within a predetermined time in response to the confirmation notification, or when the distance between the vehicle V and the unexpected user UI is equal to or larger than a second predetermined value that is larger than the first predetermined value, the determination unit 143 determines that the unexpected user will not board the vehicle V again. It is thereby possible to appropriately determine, based on the actual movement of the unexpected user UI, a case in which the unexpected user UI will not board the vehicle again.

Furthermore, according to the travel assistance device 1, travel assistance system, and travel assistance method for a vehicle of the present embodiment, when there is no input from the unexpected user UI within a predetermined time in response to the confirmation notification or when the distance between the vehicle V and the unexpected user UI is equal to or larger than a second predetermined value that is larger than the first predetermined value, the determination unit 143 determines that the unexpected user UI will not board the vehicle V again, and outputs a notification to the unexpected user UI to start the vehicle V, and the unexpected user UI can thus be alerted.

In addition, according to the travel assistance device 1, travel assistance system, and travel assistance method for a vehicle of the present embodiment, the determination unit 143 sets a possible waiting time during which the vehicle V can wait at the stop location until the unexpected user UI boards the vehicle V again, and notifies the unexpected user UI of the possible waiting time; therefore, the unexpected user can confirm the temporal information for the unexpected user to board the vehicle again.

Moreover, according to the travel assistance device 1, travel assistance system, and travel assistance method for a vehicle of the present embodiment, the determination unit 143 calculates the possible waiting time based on the input from the unexpected user UI, and it is therefore possible to set an appropriate possible waiting time in accordance with the content of the reply from the unexpected user.

Furthermore, according to the travel assistance device 1, travel assistance system, and travel assistance method for a vehicle of the present embodiment, when the departure intention of all the users U on board the vehicle U is confirmed, the output unit 145 outputs the start permission information for starting the vehicle V, and it is therefore possible to confirm the departure intention of the users on board the vehicle, and the vehicle can be started with consideration for safety.

In addition, according to the travel assistance device 1, travel assistance system, and travel assistance method for a vehicle of the present embodiment, the driving plan update unit 146 is further provided, which deletes from the driving plan of the vehicle V the alighting location of the unexpected user UI determined not to board the vehicle V again and creates a new driving plan for updating; therefore, even when there is an unexpected user who will not board the vehicle again, the travel energy corresponding to that in the case of traveling through the alighting location of the unexpected user can be reduced.

Moreover, according to the travel assistance device 1, travel assistance system, and travel assistance method for a vehicle of the present embodiment, when the driving plan is updated and the estimated time of arrival at the alighting locations of users U on board the vehicle V will be later or earlier by a predetermined value, the driving plan update unit 146 notifies the users U of the updated estimated time of arrival. Through this operation, the user whose alighting time has been updated due to the setting of a new driving plan can confirm the change status of the use information.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

S Travel assistance system for vehicle
  1 Travel assistance device
    11 Sensor
    12 Storage unit
    13 Communication unit
    14 Control unit
  2 Terminal device
    21 Control unit
    22 Communication unit
    23 Input unit
    24 Display unit
    25 Position detection unit
  3 Onboard control device
    31 Control unit
    32 Communication unit
    33 Input unit
    34 Display unit
    35 Position detection unit
    36 Travel control unit
V Vehicle
U, U1, U2, U3 User
UI Unexpected user
NW Telecommunication network

The invention claimed is:

1. A travel assistance device for a vehicle that allows a plurality of users to board/alight and travel according to a driving plan that is preliminarily created, the travel assistance device comprising:
  a storage unit that stores reservation information including at least unique identifiers and alighting locations of the users;
  a sensor that that detects at least a stop location of the vehicle and the unique identifiers of the users who board or alight from the vehicle;
  an identification unit that, when a user of the plurality of users has alighted without confirming departure intention of the user at the stop location other than the user's alighting location included in the reservation information of the user, identifies the user as an unexpected user based on the stop location of the vehicle detected by the sensor, the unique identifiers of the users who have alighted at the stop location detected by the sensor, and the unique identifiers and alighting locations of the users included in the reservation information stored in the storage unit;
a determination unit that outputs a confirmation notification to the unexpected user as to whether or not to board the vehicle again and determines, based on an input from the unexpected user in response to the output confirmation notification, that the unexpected user will not board the vehicle again;
an output unit that, when a determination is made that the unexpected user will not board the vehicle again, outputs start permission information for starting the vehicle from the stop location, and suppresses, based on starting the vehicle from the stop location without unnecessarily waiting for the unexpected user to board, loss of energy stored in the vehicle,
wherein the vehicle has a travel controller that executes autonomous travel control, and the output unit outputs the start permission information to the travel controller, and
wherein the vehicle is a driverless vehicle, and the vehicle is started automatically from the stop location to suppress the loss of energy stored in the vehicle without any driver intervention.

2. The travel assistance device for a vehicle according to claim 1, wherein the determination unit outputs the confirmation notification to the vehicle or a terminal device carried by the unexpected user.

3. The travel assistance device for a vehicle according to claim 1, wherein the determination unit outputs the confirmation notification when a distance between the vehicle and the unexpected user is a first predetermined value or more.

4. The travel assistance device for a vehicle according to claim 3, wherein when there is an input from the unexpected user in response to the confirmation notification that the unexpected user will not board the vehicle again, or when there is no input from the unexpected user within a predetermined time in response to the confirmation notification, or when a distance between the vehicle and the unexpected user is equal to or larger than a second predetermined value that is larger than the first predetermined value, the determination unit determines that the unexpected user will not board the vehicle again.

5. The travel assistance device for a vehicle according to claim 3, wherein when there is no input from the unexpected user within a predetermined time in response to the confirmation notification or when a distance between the vehicle and the unexpected user is equal to or larger than a second predetermined value that is larger than the first predetermined value, the determination unit determines that the unexpected user will not board the vehicle again, and outputs a notification to the unexpected user to start the vehicle.

6. The travel assistance device for a vehicle according to claim 1, wherein the determination unit sets a possible waiting time during which the vehicle can wait at the stop location until the unexpected user boards the vehicle again, and notifies the unexpected user of the possible waiting time.

7. The travel assistance device for a vehicle according to claim 6, wherein the determination unit calculates the possible waiting time based on the input from the unexpected user.

8. The travel assistance device for a vehicle according to claim 1, wherein when a departure intention of all users on board the vehicle is confirmed, the output unit outputs the start permission information for starting the vehicle.

9. The travel assistance device for a vehicle according to claim 1, further comprising a driving plan update unit that deletes from the driving plan of the vehicle the alighting location of the unexpected user determined not to board the vehicle again and creates a new driving plan for updating, and reduces travel energy of the vehicle based on the new driving plan without unnecessarily traveling to the alighting location of the unexpected user.

10. The travel assistance device for a vehicle according to claim 9, wherein when the driving plan is updated and an estimated time of arrival at the alighting locations of users on board the vehicle will be later or earlier by a predetermined value, the driving plan update unit notifies the users of the updated estimated time of arrival.

11. A travel assistance system for a vehicle, comprising:
a vehicle that allows a plurality of users to board/alight and travels according to a driving plan that is preliminarily created;
a travel assistance device for the vehicle; and
terminal devices carried by the users, the travel assistance device for the vehicle comprising:
a storage unit that stores reservation information including at least unique identifiers and alighting locations of the users;
a sensor that that detects at least a stop location of the vehicle and the unique identifiers of the users who board or alight from the vehicle;
an identification unit that, when a user of the plurality of users has alighted without confirming departure intention of the user at the stop location other than the user's alighting location included in the reservation information of the user, identifies the user as an unexpected user based on the stop location of the vehicle detected by the sensor, the unique identifiers of the users who have alighted at the stop location detected by the sensor, and the unique identifiers and alighting locations of the users included in the reservation information stored in the storage unit;
a determination unit that outputs a confirmation notification to the unexpected user as to whether or not to board the vehicle again and determines, based on an input from the unexpected user in response to the output confirmation notification, that the unexpected user will not board the vehicle again; and
an output unit that, when a determination is made that the unexpected user will not board the vehicle again, outputs, to the vehicle, start permission information for starting the vehicle from the stop location, and suppresses, based on starting the vehicle from the stop location without unnecessarily waiting for the unexpected user to board, loss of energy stored in the vehicle,
wherein the vehicle has a travel controller unit that executes autonomous travel control, and the output unit outputs the start permission information to the travel controller, and
wherein the vehicle is a driverless vehicle, and the vehicle is started automatically from the stop location to suppress the loss of energy stored in the vehicle without any driver intervention.

12. A travel assistance method for a vehicle that allows a plurality of users to board/alight and travel according to a driving plan that is preliminarily created, the travel assistance method comprising:
storing reservation information including at least unique identifiers and alighting locations of the users;

detecting at least a stop location of the vehicle and the unique identifiers of the users who board or alight from the vehicle;

identifying, when a user of the plurality of users has alighted without confirming departure intention of the user at the stop location other than the user's alighting location included in the reservation information of the user, the user as an unexpected user based on the detected stop location of the vehicle, the unique identifiers of the users who have alighted at the stop location, and the unique identifiers and alighting locations of the users included in the stored reservation information;

outputting a confirmation notification to the unexpected user as to whether or not to board the vehicle again and determining, based on an input from the unexpected user in response to the output confirmation notification, that the unexpected user will not board the vehicle again; and when determining that the unexpected user will not board the vehicle again, outputting start permission information for starting the vehicle from the stop location, and suppressing, based on starting the vehicle from the stop location without unnecessarily waiting for the unexpected user to board, loss of energy stored in the vehicle, wherein the vehicle has a travel controller that executes autonomous travel control, and the output unit outputs the start permission information to the travel controller, and wherein the vehicle is a driverless vehicle, and the vehicle is started automatically from the stop location to suppress the loss of energy stored in the vehicle without any driver intervention.

* * * * *